United States Patent Office 3,793,372
Patented Feb. 19, 1974

3,793,372
N-CYANOHALOALKANESULFONANILIDES
John F. Gerster, Woodbury, Minn., assignor to Minnesota Mining and Manufacturing Company, St. Paul, Minn.
No Drawing. Filed July 28, 1971, Ser. No. 166,992
Int. Cl. G07c 143/74
U.S. Cl. 260—556 F
9 Claims

ABSTRACT OF THE DISCLOSURE

N-cyanohaloalkanesulfonanilides wherein the phenyl ring is optionally substituted by a substituent containing no cyclic groups and processes for their preparation are disclosed. These compounds and their compositions are effective herbicides.

---

This invention relates to N-cyanohaloalkanesulfonanilides wherein the phenyl ring is optionally substituted by a substituent containing no cyclic groups and processes for their preparation. These compounds and their compositions are effective herbicides and plant growth modifiers, particularly pre-emergence and post-emergence herbicides. Plants may be treated with the compounds of the invention as seeds or at various stages of growth, from seeds onward.

The invention also includes processes for the preparation of the compounds, compositions containing them and methods for their use as herbicides, and plant growth modifiers.

It is an object of the invention to provide compounds which modify the growth of plants, i.e. compounds which prevent, alter, destroy, or otherwise affect the growth of plants.

It is a further object of the invention to provide a method for controlling unwanted plants.

It is another object of the invention to provide herbicidal compositions containing one or more N-cyanohaloalkanesulfonanilides as active ingredients therein.

Still other objects of the invention will be made apparent by the following specification.

DETAILED DESCRIPTION

According to the present invention, there is provided a class of compounds having the general formula:

(I)

wherein $R_x$ is haloalkyl of one to four carbon atoms and Ar is a phenyl ring optionally substituted by one or more substituents containing no cyclic groups. Preferably, the phenyl ring is unsubstituted or contains one or two substituents, although it can contain as many as five substituents.

The haloalkane group generally contains one to four carbon atoms. It is preferred that the haloalkane group is perhalogenated, although about one hydrogen atom per two halogen atoms may be present. The halogen may be fluorine, chlorine, bromine or iodine, although when iodine or bromine are present, there are generally at least two atoms of fluorine or chlorine per other halogen. The preferred halogens are fluorine and chlorine, and most preferred is fluorine. The haloalkane group perferably contains one carbon atom, and most preferably it is trifluoromethyl.

The non-cyclic substituents on the phenyl ring must be sufficiently stable and non-reactive (e.g. toward cyanogen halides) to make possible the preparation and isolation of the compounds and their formulation and use as plant growth modifiers, especially as herbicides. These include (but are not limited to) halogen, nitro, cyano, aldehydo, alkyl, halolakyl, alkoxy, haloalkoxy, alkylthio, haloalkylthio, alkanoyl, haloalkanoyl, hydroxyalkyl, carbalkoxy, lower alkanoylsemicarbazone, N-alkylcarbamyloxy, alkylsulfinyl, haloalkylsulfinyl, alkylsulfonyl, haloalkylsulfonyl, alkylsulfonoxy, haloalkylsulfonoxy, alkylsulfonato and haloalkylsulfonato. Normally these substituents will contain no more than four carbon atoms each. Presently preferred substituent groups are halogen, haloalkyl, haloalkylthio, alkylthio, alkyl and alkoxy. When the substituents are alkyl and substituted alkyl substituents it is preferred that alkyl is methyl. Most preferred halogens are fluoro, chloro and bromo. When more than one substituent is present the substituents may be the same or mixed.

The compounds of the invention are prepared by the reaction of a salt of a haloalkanesulfonanilide with a cyanogen halide. The salt of the haloalkanesulfonanilide may be preformed, or it may be formed in situ. Haloalkanesulfonanilides of the type useful as precursors to the compounds of the present invention are organic acids of sufficient acid strength to readily form salts with many bases. Although not all of the precursor anilides are equally strong acids, many form salts by simple reaction with relatively weak bases, sodium carbonate, potassium carbonate, and organic amines, and strong bases such as alkali metal hydroxides.

Substituent groups on the anilide phenyl ring which react with weak bases sufficiently readily to preclude the formation of the salt are not suitable to prepare compounds of the present invention. Similarly, compounds of the present invention do not include those containing substituent groups which react rapidly with cyanogen halides.

The cyanogen halides which are preferred for use in the preparation of the compounds of the invention are cyanogen chloride and cyanogen bromide. The reactive haloalkanesulfonanilide salt is generally formed by reaction with a base in a suitable solvent. If the solvent is reactive with respect to the cyanogen halide to be used, it is removed, generally by evaporation in vacuo. Ethers, for example di-n-propyl ether, 1,2-dimethoxyethane and the like are generally suitable for the reaction of the cyanogen halide with the salt. The reaction may be carried out at room temperature or a somewhat higher temperature up to the reflux temperature of the solvent, although it is clear that the reaction will be completed more rapidly at higher temperatures, and it has generally been convenient to heat the reaction at the reflux temperature of the solvent for one-fourth to eight hours.

The compounds of the invention are easily isolated and purified by conventional methods, and may be solids or liquids. The precursor haloalkanesulfonanilides are prepared as follows:

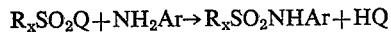

where Q is a halogen atom or the corresponding anhydride, $OSO_2R_x$, grouping and $R_x$ and Ar are as previously defined.

The reaction is usually run in the presence of a suitable acid acceptor, which may be an organic or inorganic base. When Q is halogen it is preferably fluorine.

A solution of the primary arylamine and at least an equimolar quantity of a suitable acid acceptor (such as dimethylaniline or triethylamine) in an inert organic solvent is prepared. Among the suitable solvents are glyme, benzene, dichloromethane and chloroform. An equimolar quantity of the appropriate haloalkanesulfonic anhydride or halide is added to the solution. The addition is advantageously carried out at −15 to 150° C., but this may be raised or lowered if desried. In cases where the amine is of lower reactivity, it is advantageous to allow the reaction mixture to remain at reflux temperature for a few hours following addition.

After completion of the reaction, the product is isolated by conventional methods. For example, the reaction mixture can be extracted with excess aqueous sodium hydroxide. The aqueous extract is then washed with organic solvents and treated with charcoal to remove impurities. Subsequent acidification of the aqueous extract with mineral acid then affords the product as an oil or solid which is distilled, sublimed, chromatographed or recrystallized as required to give pure product. When water-soluble solvents are used, the reaction mixture can be poured directly into aqueous mineral acids. The product is then isolated by conventional extraction techniques and purified as above.

The reaction may also be run in a closed reactor, and when this is done solvent is not usually necessary, and Q is usually fluorine, although an acid acceptor, generally triethylamine, is necessary. The temperatures utilized depend on the reactivity of the reactants, but may be between 0 and 200° C., and are generally 50 to 150° C.

The herbicidal activity of the compounds of the invention has been determined by standard screening methods against both broad-leafed plants and grasses. They are active against broad-leaves and grasses both pre-emergence and post-emergence.

In order to control unwanted plants, the compounds of the invention can be used alone as herbicides, for example, as dusts or granules of the compounds, or preferably they may be applied in formulations containing the active ingredients in a horticulturally acceptable extending medium. Thus, the herbicidal composition applied to the plants may contain from about 5 to 100 percent of the active compound.

The formulations are comprised of one or more active ingredients and one or more herbicidal adjuvants and/or carriers. Specific formulations are useful to facilitate the application of the compounds and to achieve specific biological objectives such as controlling the availability of the herbicide, improving adherence to plants, and the like, as is well known to those skilled in the art.

The compounds of the invention may be formulated as wettable powders, emulsifiable concentrates, aqueous or non-aqueous solutions and/or suspensions, granules, dusts and the like. Said compounds as such can be finely divided and dispersed or suspended in any of the usual aqueous media, in which they are stable, or if appropriate salts are used, a solution may be made. Spreading agents, wetting agents, sticking agents or other adjuvants can be added as desired.

When emulsifiable concentrates are prepared the active ingredient can be present in concentration of about 5% to 60% or more, depending upon its solubility, but it has been found that the compounds of this invention are preferably used in a concentration of 20 to 30%. The units of concentration are weight per unit weight. The active ingredients are soluble in common organic horticultural solvents such as benzene, toluene, xylene, dichloromethane, chloroform, hexane and heptane or less highly refined aromatic or aliphatic hydrocarbons and mixtures thereof. Examples of these are coal tar fractions, straight run petroleum distillates, thermolytically or catalytically cracked hydrocarbon oil, gas oil, light lubricating oil fractions, kerosene, mineral seal oil, and the like. In appropriate cases, oxygenated solvents such as ketones may be used in or as the carriers. These concentrates can be dispersed in water to permit the use of an aqueous spray. A mixture with a small amount of an organic surface active agent capable of lowering the surface tension of water is preferred, so as to produce more or less stable emulsions.

Examples of surface active agents variously known as dispersing agents, wetting agents or emulsifying agents comprise soft or hard soaps, morpholine or dimethylamine oleate, sulfonated fish, castor and petroleum oils, sodium salts of lignin sulfonic acid, alkylated aromatic sodium sulfonates, such as decylbenzene sodium sulfonate, dodecylbenzene sodium sulfonate, butyl or other amine salts of decyl or dodecylbenzene sulfonic acid, sodium lauryl sulfate, disodium monolauryl phosphate, ethylene oxide condensation products of alkyl phenols, as for example octyl phenol, ethylene oxide condensation products of tall oil and ethylene oxide condensation products of higher alcohols or higher mercaptans. Mixtures of two or more surface active agents are also feasible. Generally, the surface active agent will comprise only a small proportion of the composition, say 0.1–15% by weight of the toxicant.

The formulation of dry compositions for application as granules, dusts or for further dilution with liquid carriers is readily accomplished by mixing the toxicant with a solid carrier. Such solid carriers will be of various sizes from dust to granules. The techniques for such formulations are well known to the art. Suitable carriers include charcoal, talc, clay, pyrophyllite, silicas, fuller's earth, lime, diatomaceous earth, flours such as walnut shell, wheat, soya bean, cottonseed and wood flours, magnesium and calcium carbonate, calcium phosphate and the like. Powders may be granulated by the use of suitable binders such as cellulose derivatives, for example ethyl or carboxymethyl, corn syrup, and the like. The compounds or the above formulations are applied by spraying, spreading, dusting or the like. The rate of application will of course vary, but the more active compounds of the invention exhibit satisfactory control of broadleaf and grass weeds at the application rate of about 1 to 15 pounds per acre. It is of course to be expected that local conditions, for example, temperature, humidity, moisture content of the soil, nature of the soil, and the like, may require greater or smaller amounts. Effective resolution of these factors is within the skill of those versed in the herbicidal art. Likewise it is apparent that not all of the compounds included within the scope of the invention have equal activity.

The herbicidal compositions may contain one or more of the herbicidal compounds set out hereinbefore as the sole active species, or they may contain in addition thereto other biologically active substances. Thus insecticides and fungicides may be incorporated in the compositions. Further, if desired, the herbicidal compositions may contain fertilizers, trace metals or the like and when applied directly to the soil may additionally contain nematicides, soil conditioners, plant growth regulators, and/or herbicides of similar or different properties.

Presently especially preferred herbicidal compounds of this invention are

N-cyano-2,4-dichlorotrifluoromethanesulfonanilide,
N-cyano-2,4-difluorotrifluoromethanesulfoanilide, and
N-cyano-2-fluoro-4-chlorotrifluoromethanesulfonanilide.

The following examples are given for the purpose of further illustrating the procedures of the present invention, but are not intended, in any way, to be limiting on the scope thereof. Thus while most of the examples relate to perfluoromethanesulfonamides, other perfluorocarbon groups can be substituted in place thereof. The melting points in the examples are uncorrected.

Example 1

To a stirred solution of sodium methoxide (0.053 mole) in methanol (150 ml.) is added 2,4-dichlorotrifluoromethanesulfonanilide (15.7 g., 0.053 mole) and the mixture is stirred for twenty minutes, then evaporated in vacuo to give solid sodium 2,4-dichlorotrifluoromethanesulfonanilide. This salt is dissolved in 1,2-dimethoxyethane (100 ml.) and cyanogen bromide (5.3 g., 0.05 mole) in a small amount of 1,2-dimethoxyethane is added. The mixture is heated and refluxed on a steam bath for one hour, then it is filtered. The volatile portions of the mixture are removed by evaporation in vacuo, then the heavy oil obtained is distilled under reduced pressure. The product is collected, N-cyano-2,4-dichlorotrifluoromethanesulfonanilide, B.P. 106° C. at 0.15 mm. of mercury.

*Analysis.*—Calculated for $C_8H_3Cl_2F_3N_2O_2S$ (percent): C, 30.1; H, 0.9; N, 8.8. Found (percent): C, 29.9; H, 1.2; N, 8.3.]

The following table describes compounds of the invention wherein $R_x$ is trifluoromethyl prepared using the synthetic method described in detail by Example 1.

TABLE I

| Ex. No. | Compound | Melting point (in ° C.) or boiling point (in ° C./mm. Hg) |
|---|---|---|
| 2 | N-cyanotrifluoromethanesulfonanilide | 77/0.08 |
| 3 | N-cyano-4-ethoxytrifluoromethanesulfonanilide | 132/0.3 |
| 4 | N-cyano-4-chlorotrifluoromethanesulfonanilide | 68/0.1 |
| 5 | N-cyano-2,4-difluorotrifluoromethanesulfonanilide | 60/0.2 |
| 6 | N-cyano-4-trifluoromethyltrifluoromethanesulfonanilide | 64/0.2 |
| 7 | N-cyano-4-methylthiotrifluoromethanesulfonanilide | 123/0.2 |
| 8 | N-cyano-2-methylthiotrifluoromethanesulfonanilide | 85–93 |
| 9 | N-cyano-3-methylthiotrifluoromethanesulfonanilide | 113/0.2 |

The following table described compounds of the invention wherein both $R_x$ and Y are varied which are prepared using the synthetic method described in detail by Example 1.

TABLE II

Example No.   Compound

10  N-cyano-4-chlorodichloromethanesulfonanilide
11  N-cyano-4-chlorodifluoromethanesulfonanilide
12  N-cyanofluorochloromethanesulfonanilide
13  N-cyano-2,3,4,5,6-pentafluoroperfluoroethanesulfonanilide
14  N-cyano-4-nitrotrifluoromethanesulfonanilide
15  N-cyano-4-methylsulfonyltrifluoromethanesulfonanilide
16  N-cyano-3-methyl-4-fluorotrifluoromethanesulfonanilide
17  N-cyano-4-methylsulfinyldifluoromethanesulfonanilide
18  N-cyano-2-fluoro-4-chlorotrifluoromethanesulfonanilide
19  N-cyano-4-chloroperfluoro-*n*-butanesulfonanilide
20  N-cyano-4-chloro-(2-hydroperfluoroethane)sulfonanilide
21  N-cyano-2,4-dichloro-(2,2,2-trifluoroethane)sulfonanilide
22  N-cyano-4-trifluoromethoxytrifluoromethanesulfonanilide
23  N-cyano-4-trifluoromethylthiotrifluoromethanesulfonanilide
24  N-cyano-4-trifluoromethylsulfonyltrifluoromethanesulfonanilide
25  N-cyano-4-methylsulfonoxytrifluoromethanesulfonanilide
26  N-cyano-4-trifluoromethylsulfonoxytrifluoromethanesulfonanilide
27  N-cyano-4-methyltrifluoromethanesulfonanilide
28  N-cyano-4-butyltrifluoromethanesulfonanilide

What is claimed is:

1. An N-cyanohaloalkanesulfonanilide characterized by the formula:

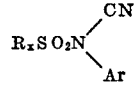

wherein $R_x$ is a haloalkyl group of one to four carbon atoms selected from perhalogenated groups and partially halogenated groups containing not more than one hydrogen atom per two halogen atoms, the halogen atoms being selected from fluorine and chlorine and Ar is selected from phenyl and phenyl substituted by halogen, nitro, alkyl, haloalkyl, alkoxy, haloalkoxy, alkylthio, haloalkylthio, alkylsulfinyl, alkylsulfonyl, haloalkylsulfonyl, alkylsulfonoxy and haloalkylsufonoxy, wherein each substituent contains no more than four carbon atoms.

2. A compound according to claim 1 wherein $R_x$ is trifluoromethyl.

3. A compound according to claim 1 wherein Ar contains not more than two substituents and those are selected from halogen, haloalkyl, haloalkylthio, alkylthio, alkyl and alkoxy.

4. A compound according to claim 1 wherein Ar is halogen-substituted phenyl.

5. The compound N-cyano-2,4-dichlorotrifluoromethanesulfonanilide according to claim 9.

6. The compound N-cyano-2,4-difluorotrifluoromethanesulfonanilide according to claim 9.

7. The compound N-cyano-2-fluoro-4-chlorotrifluoromethanesulfonanilide according to claim 9.

8. A compound according to claim 1 wherein Ar is methylthio-substituted phenyl.

9. An N-cyanohaloalkanesulfonanilide characterized by the formula:

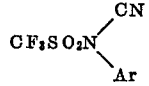

wherein Ar is a halogen substituted phenyl ring.

References Cited
UNITED STATES PATENTS 3,576,866   4/1971   Robertson et al. ___ 260—556 F
3,639,474   2/1972   Harrington et al. ___ 260—556 F
3,647,874   3/1972   Gerster _____ 260—556 F HENRY R. JILES, Primary Examiner
S. D. WINTERS, Assistant Examiner U.S. Cl. X.R.

260—556 A, 465 E, 470, 554, 482 C, 508, 543 R; 71—103